United States Patent
Coffey et al.

(10) Patent No.: US 8,734,286 B2
(45) Date of Patent: May 27, 2014

(54) MULTI-SPEED PLANETARY GEAR SET TRANSMISSION

(71) Applicant: GM Global Technology Operations LLC, Detroit, MI (US)

(72) Inventors: Dan Coffey, Howell, MI (US); Tejinder Singh, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/774,672

(22) Filed: Feb. 22, 2013

(65) Prior Publication Data

US 2013/0237365 A1    Sep. 12, 2013

Related U.S. Application Data

(60) Provisional application No. 61/609,610, filed on Mar. 12, 2012.

(51) Int. Cl.
*F16H 3/62*    (2006.01)

(52) U.S. Cl.
USPC .......................................................... 475/276

(58) Field of Classification Search
USPC ........................... 475/275, 276, 277, 475, 476
See application file for complete search history.

(56) References Cited

U.S. PATENT DOCUMENTS

| | | | |
|---|---|---|---|
| 4,004,473 A * | 1/1977 | Pearce et al. ..................... 475/66 |
| 6,991,578 B2 | 1/2006 | Ziemer | |
| 7,011,597 B2 | 3/2006 | Haka | |
| 7,018,319 B2 | 3/2006 | Ziemer | |
| 2008/0039285 A1 | 2/2008 | Park | |
| 2013/0157796 A1 * | 6/2013 | Etchason ....................... 475/275 |

OTHER PUBLICATIONS

Pending U.S. Appl. No. 13/676,896, filed Nov. 14, 2012, by Singh. All pages.
Pending U.S. Appl. No. 13/679,352, filed Nov. 16, 2012, by Singh, All pages.

* cited by examiner

*Primary Examiner* — Justin Holmes
*Assistant Examiner* — Stacey Fluhart

(57) ABSTRACT

A transmission has an input member, an output member, at least four planetary gear sets, a plurality of coupling members and a plurality of torque transmitting devices. Each of the planetary gear sets includes first, second and third members. The torque transmitting devices include clutches and brakes actuatable in combinations of two to establish a plurality of forward gear ratios and one reverse gear ratio.

26 Claims, 4 Drawing Sheets

| GEAR STATE | GEAR RATIO | RATIO STEP | TORQUE TRANSMITTING ELEMENTS | | | | | |
|---|---|---|---|---|---|---|---|---|
| | | | 26 | 28 | 38 | 34 | 36 | 32 |
| REV | -2.930 | | X | | | | X | |
| N | | -0.64 | | | | | | |
| 1ST | 4.585 | | | | X | | X | |
| 2ND | 2.864 | 1.60 | | | X | X | | |
| 3RD | 1.805 | 1.59 | X | | X | | | |
| 4TH | 1.386 | 1.30 | | X | | X | | |
| 5TH | 1.000 | 1.39 | X | X | | | | |
| 6TH | 0.904 | 1.11 | | X | | | | X |
| 7TH | 0.746 | 1.21 | | X | | X | | |
| 8TH | 0.621 | 1.20 | X | | | | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS ||||||| 
|---|---|---|---|---|---|---|---|---|---|
| | | | 26 | 28 | 38 | 34 | 36 | 32 | 30 |
| REV | -2.930 | | X | | | | X | | |
| N | | -0.64 | | | | | | | |
| 1ST | 4.585 | | | | X | | X | | |
| 2ND | 2.864 | 1.60 | | | X | X | | | |
| 3RD | 2.500 | 1.15 | | | X | | | X | |
| 4TH | 2.277 | 1.10 | | | X | | | | X |
| 5TH | 1.805 | 1.26 | X | | X | | | | |
| 6TH | 1.386 | 1.30 | | X | X | | | | |
| 7TH | 1.000 | 1.39 | X | X | | | | | |
| 8TH | 0.904 | 1.11 | | X | | | | X | |
| 9TH | 0.746 | 1.21 | | X | | X | | | |
| 10TH | 0.621 | 1.20 | X | | | | | X | |

X = ON - ENGAGED CARRYING TORQUE
O = ON - ENGAGED NOT CARRYING TORQUE

MULTI-SPEED PLANETARY GEAR SET TRANSMISSION

CROSS-REFERENCE TO RELATED APPLICATION

This application claims the benefit of U.S. Provisional Application No. 61/609,610 filed Mar. 12, 2012. The disclosure of the above application is incorporated herein by reference.

FIELD

The invention relates generally to a multiple speed transmission having a plurality of planetary gear sets and a plurality of torque transmitting devices and more particularly to a transmission having a plurality of speeds, at least four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In another aspect of the present invention, a transmission having a first, second, third and fourth planetary gear sets each having a sun gear, a carrier member and a ring gear is provided.

In another aspect of the present invention, the input member of the transmission is continuously connected for common rotation with the sun gear of the third planetary gear set.

In another aspect of the present invention, the output member of the transmission is continuously connected for common rotation with the carrier member of the first planetary gear set and the ring gear of the second planetary gear set.

In another aspect of the present invention, the carrier member of the third planetary gear set is configured to support a first and a second set of pinions. The first set of pinions mesh with both the sun gear of the third planetary gear set and the second set of pinions and the second set of pinions mesh with both the ring gear of the third planetary gear set and the first set of pinions.

In another aspect of the present invention, the carrier member of the fourth planetary gear set is configured to support a first and a second set of pinions. The first set of pinions mesh with both the sun gear of the fourth planetary gear set and the second set of pinions and the second set of pinions mesh with both the ring gear of the fourth planetary gear set and the first set of pinions.

In another aspect of the present invention, a first interconnecting member continuously interconnects the carrier member of the first planetary gear set with the ring gear of the second planetary gear set.

In another aspect of the present invention, a second interconnecting member continuously interconnects the ring gear of the first planetary gear set with the ring gear of the third planetary gear set.

In another aspect of the present invention, a third interconnecting member continuously interconnects the carrier member of the second planetary gear set with the carrier member of the third planetary gear set and the ring gear of the fourth planetary gear set.

In another aspect of the present invention, a fourth interconnecting member continuously interconnects the sun gear of the second planetary gear set with the carrier member of the fourth planetary gear set.

In another aspect of the present invention, a first torque transmitting mechanism is selectively engageable to interconnect the sun gear of the second planetary gear set with the sun gear of the third planetary gear set and the input member.

In another aspect of the present invention, a second torque transmitting mechanism is selectively engageable to interconnect the sun gear of the third planetary gear set and the input member with the ring gear of the fourth planetary gear set.

In another aspect of the present invention, a third torque transmitting mechanism is selectively engageable to interconnect the sun gear of the fourth planetary gear set with the stationary member.

In another aspect of the present invention, a fourth torque transmitting mechanism is selectively engageable to interconnect the sun gear of the second planetary gear set with the stationary member.

In another aspect of the present invention, a fifth torque transmitting mechanism is selectively engageable to interconnect the carrier member of the third planetary gear set with the stationary member.

In another aspect of the present invention, a sixth torque transmitting mechanism is selectively engageable to interconnect the sun gear of the first planetary gear set with the stationary member.

In another aspect of the present invention, a seventh torque transmitting mechanism is selectively engageable to interconnect the first member of the fourth planetary gear set with the first member of the second planetary gear set and the second member of the fourth planetary gear set.

In another aspect of the present invention, the torque transmitting mechanisms are selectively engageable in combinations of at least two to establish a plurality of forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 7 is a truth table presenting the state of engagement of the various torque transmitting elements in each of the available ten forward and reverse speeds or gear ratios of the ten speed transmissions illustrated in FIG. 5 and FIG. 6.

DETAILED DESCRIPTION

The following description is merely exemplary in nature and is not intended to limit the present disclosure, application, or uses.

At the outset, it should be appreciated that the embodiments of the multi-speed automatic transmissions of the present invention have an arrangement of permanent mechanical connections between the elements of the four planetary gear sets. A second component or element of a first planetary gear set is permanently coupled to a third component or element of the second planetary gear set. A third component or element of the first planetary gear set is permanently coupled to a second component or element of the third planetary gear set. A second component or element of the second planetary gear set is permanently coupled to a third component or element of the third planetary gear set and a third component or element of the fourth planetary gear set. A first component or element of the second planetary gear set is permanently coupled to a second component or element of the fourth planetary gear set.

Figure 1:
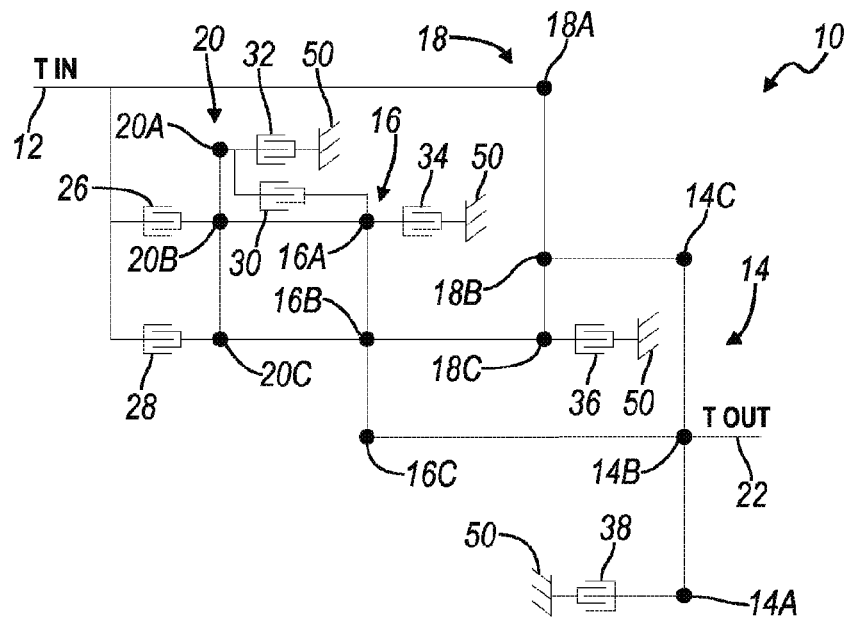
FIG. 1 is a lever diagram of an embodiment of a multi-speed transmission according to the present invention.

Referring now to FIG. 1, an embodiment of a multi-speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. In the lever diagram of FIG. 1, the first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 18A of the third planetary gear set 18. The output member 22 is coupled to the second node 14B of the first planetary gear set 14 and the third node 16C of the second planetary gear set 16. The second node 14B of the first planetary gear set 14 is coupled to the third node 16C of the second planetary gear set 16. The third node 14C of the first planetary gear set 14 is coupled to the second node 18B of the third planetary gear set 18. The second node 16B of the second planetary gear set 16 is coupled to the third node 18C of the third planetary gear set 18 and to the third node 20C of the fourth planetary gear set 20. The first node 16A of the second planetary gear set 16 is coupled to second node 20B of the fourth planetary gear set 20.

A first clutch 26 selectively connects the input member or shaft 12 and the first node 18A of the third planetary gear set 18 with the first node 16A of the second planetary gear set 16 and the second node 20B of the fourth planetary gear set 20. A second clutch 28 selectively connects the input member or shaft 12 and the first node 18A of the third planetary gear set 18 with the second node 16B of the second planetary gear set 16, the third node 18C of the third planetary gear set 18 and the third node 20C of the fourth planetary gear set 20. A third clutch 30 selectively connects the first node 16A of the second planetary gear set 16 and the second node 20B of the fourth planetary gear set 20 with the first node 20A of the fourth planetary gear set 20. A first brake 32 selectively connects the first node 20A of the fourth planetary gear set 20 with a stationary member or transmission housing 50. A second brake 34 selectively connects the first node 16A of the second planetary gear set 16 and the second node 20B of the fourth planetary gear set 20 with the stationary member or transmission housing 50. A third brake 36 selectively connects the third node 18C of the third planetary gear set 18, the second node 16B of the second planetary gear set 16 and the third node 20C of the fourth planetary gear set 20 with the stationary member or transmission housing 50. A fourth brake 38 selectively connects the first node 14A of the first planetary gear set 14 with a stationary member or transmission housing 50.

Figure 2:
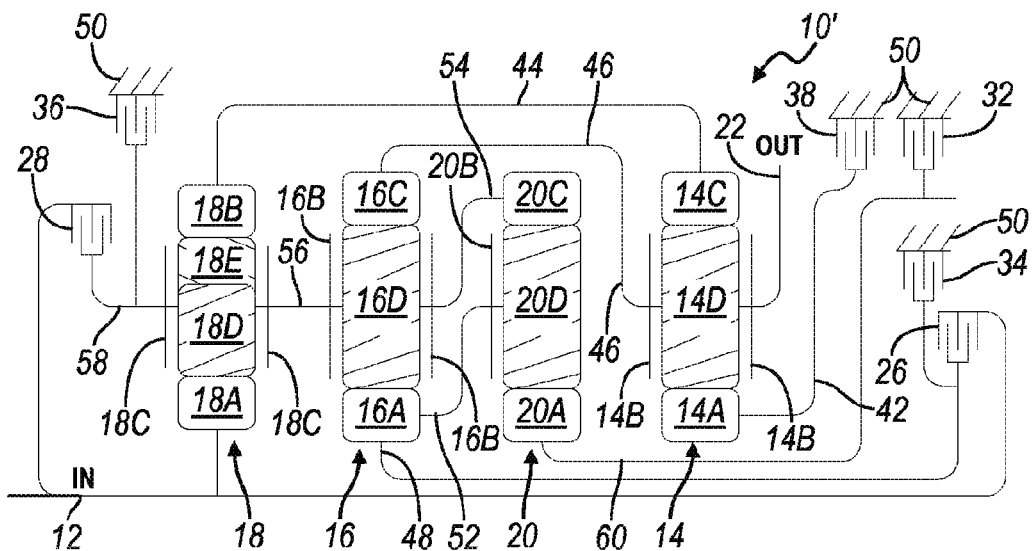
FIG. 2 is a diagrammatic illustration of an embodiment of an eight speed transmission according to the present invention.

Referring now to FIG. 2, a stick diagram presents a schematic layout of an embodiment of the multi-speed transmission 10' according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers. However, in the present embodiment clutch 30 has been removed and is not necessary to achieve the desired gear ratios. In other embodiments of the present invention clutch 30 is provided to establish additional gear ratios as described below.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42. The ring gear member 14C is connected for common rotation with a second shaft or interconnecting member 44. The planet carrier member 14B is connected for common rotation with a third shaft or interconnecting member 46 and the output shaft or member 22. The planet gears 14D are each configured to intermesh with both the sun gear member 14A and the ring gear member 14C.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with a fourth shaft or interconnecting member 48 and a fifth shaft or interconnecting member 52. The ring gear member 16C is connected for common rotation with the third shaft or interconnecting member 46. The planet carrier member 16B is connected for common rotation with the sixth shaft or interconnecting member 54 and the seventh shaft or interconnecting member 56. The planet gears 16D are each configured to intermesh with both the sun gear member 16A and the ring gear member 16C.

The planetary gear set 18 includes a sun gear member 18A, a ring gear member 18B and a planet gear carrier member 18C that rotatably supports a first set of planet gears 18D (only one of which is shown) and a second set of planet gears 18E (only one of which is shown). The sun gear member 18A is connected for common rotation with an input shaft or member 12. The ring gear member 18B is connected for common rotation with the second shaft or interconnecting member 44. The planet carrier member 18C is connected for common rotation with the seventh shaft or interconnecting member 56 and with an eighth shaft or interconnecting member 58. The first set of planet gears 18D are each configured to intermesh with both the sun gear member 18A and the second set of planet gears 18E. The second set of planet gears 18E are each configured to intermesh with both the ring gear member 18B and the first set of planet gears 18D.

The planetary gear set 20 includes a sun gear member 20A, a ring gear member 20C and a planet gear carrier member 20B that rotatably supports a set of planet gears 20D (only one of which is shown). The sun gear member 20A is connected for common rotation with a ninth shaft or interconnecting member 60. The ring gear member 20C is connected for common rotation with a sixth shaft or interconnecting member 54. The planet carrier member 20B is connected for common rotation with the fifth shaft or interconnecting member 52. The planet gears 20D are each configured to intermesh with both the sun gear member 20A and the ring gear member 20C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28 and brakes 32, 34, 36 and 38 allow for selective interconnection of the shafts or interconnecting members, members of the planetary gear sets and the housing. For example, the first clutch 26 is selectively engageable to connect the input shaft or member 12 with the fourth shaft or interconnecting member 48. The second clutch 28 is selectively engageable to connect the input shaft or member 12 with the eighth shaft or interconnecting member 58. The first brake 32 is selectively engageable to connect the ninth shaft or interconnecting member 60 with the stationary element or the transmission housing 50 in order to restrict the member 60 from rotating relative to the transmission housing 50. The second brake 34 is selectively engageable to connect the fourth shaft or interconnecting member 48 with the stationary element or the transmission housing 50 in order to restrict the member 48 from rotating relative to the transmission housing 50. The third brake 36 is selectively engageable to connect the eighth shaft or interconnecting member 58 with the stationary element or the transmission housing 50 in order to restrict the member 58 from rotating relative to the transmission housing 50. The fourth brake 38 is selectively engageable to connect the first shaft or interconnecting member 42 with the stationary element or the transmission housing 50 in order to restrict the member 42 from rotating relative to the transmission housing 50.

Figures 3, 4:
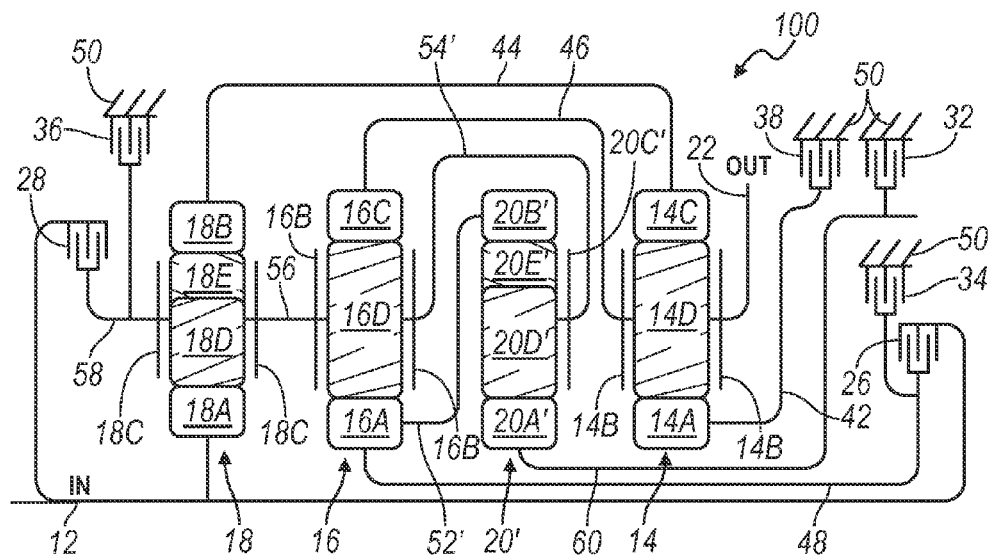
FIG. 3 is a diagrammatic illustration of an alternate embodiment of an eight speed transmission according to the present invention.
FIG. 4 is a truth table presenting the state of engagement of the various torque transmitting elements in each of the available eight forward and reverse speeds or gear ratios of the transmissions illustrated in FIGS. 2 and 3.

Referring now to FIG. 3, an alternate embodiment of a multi-speed transmission is illustrated in schematic form and referenced by reference numeral 100. Transmission 100 has the same number of planetary gear sets and torque transmitting mechanisms as described above with respect to transmission 10'. However, transmission 100 provides the same three planetary gear sets 14, 16 and 18 as described with respect to transmission 10', but in contrast to transmission 10' a different fourth planetary gear set 20' is provided that replaces the planetary gear set 20 of transmission 10'. Planetary gear set 20' is a compound planetary gear set that has a sun gear 20A', a ring gear 20B' and a carrier member 20C' that supports two sets of planetary pinion gears 20D' and 20E'. Pinion gears 20D' mesh with both the sun gear 20A' and the second set of pinion gears 20E'. Pinion gears 20E' mesh with both the ring gear 20B' and the first set of pinion gears 20D'. In addition to the substitution of planetary gear set 20 with the compound planetary gear set 20', interconnecting members 52 and 54 are eliminated and new reconfigured interconnecting member 52' and 54' are provided. Interconnecting member 52' interconnects sun gear member 16A for common rotation with ring gear member 20B'. Interconnecting member 54' interconnects carrier member 16B for common rotation with carrier member 20C'.

Referring now to FIG. 2, FIG. 3 and FIG. 4, the operation of the multi-speed transmissions 10' and 100 will be described. In the embodiments of transmissions 10' and 100 the third clutch 30 is removed and is not necessary to achieve the desired gear ratios. It will be appreciated that transmissions 10' and 100 are capable of transmitting torque from the input shaft or member 12 to the output shaft or member 22 in eight forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 32, second brake 34, third brake 36 and fourth brake 38), as will be explained below. FIG. 4 is a truth table presenting the various combinations of torque-transmitting mechanisms that are activated or engaged to achieve the eight forward and one reverse gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmissions 10' and 100. Of course, other gear ratios are achievable depending on the gear diameter, gear teeth count and gear configuration selected.

For example, transmission 10' and 100 establish a reverse gear by engaging or activating the first clutch 26 and the third brake 36. The first clutch 26 connects the input shaft or member 12 with sun gear member 16A. The third brake 36 connects the carrier member 18C with the stationary element or the transmission housing 50 in order to restrict the member 18C from rotating relative to the transmission housing 50. Likewise, the eight forward ratios are achieved through different combinations of clutch and brake engagement, as shown in FIG. 4.

Figure 5:
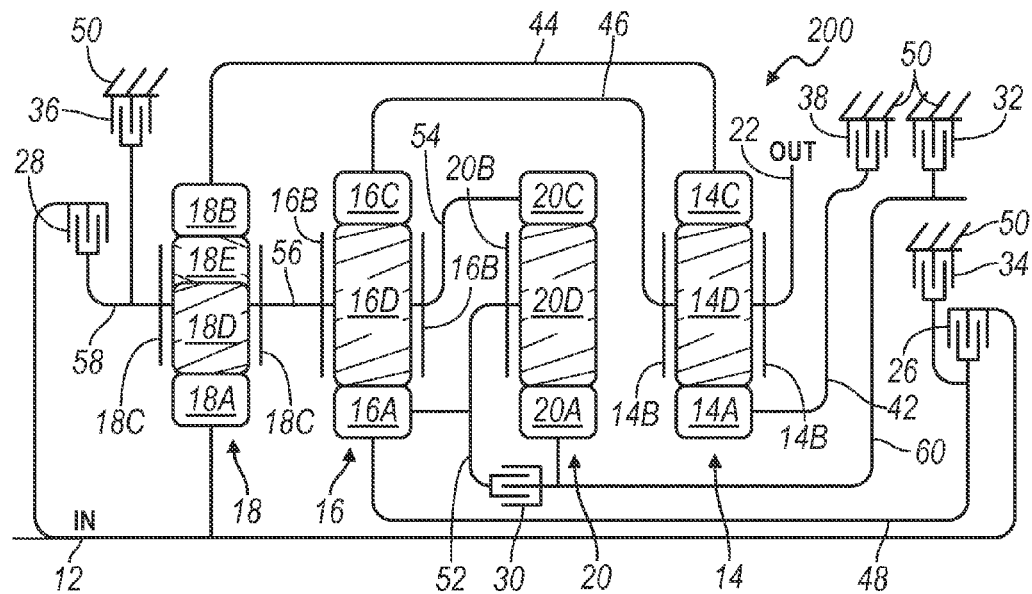
FIG. 5 is a diagrammatic illustration of an embodiment of a ten speed transmission according to the present invention.

Referring now to FIG. 5, yet another embodiment of a multi-speed transmission is illustrated in schematic form and referenced by reference numeral 200, in accordance with the present invention. Transmission 200, with the exception of the addition of a third clutch 30, has the same physical components and interconnections (i.e. planetary gear sets, clutches, brakes and interconnections) as shown and described with respect to transmission 10'. Third clutch 30 is selectively engageable to interconnect interconnecting member or shaft 52 with interconnecting member or shaft 60. More specifically, third clutch 30 is selectively engageable to interconnect carrier member 20B and sun gear 16A with sun gear 20A, as shown in FIG. 5.

Figure 6:
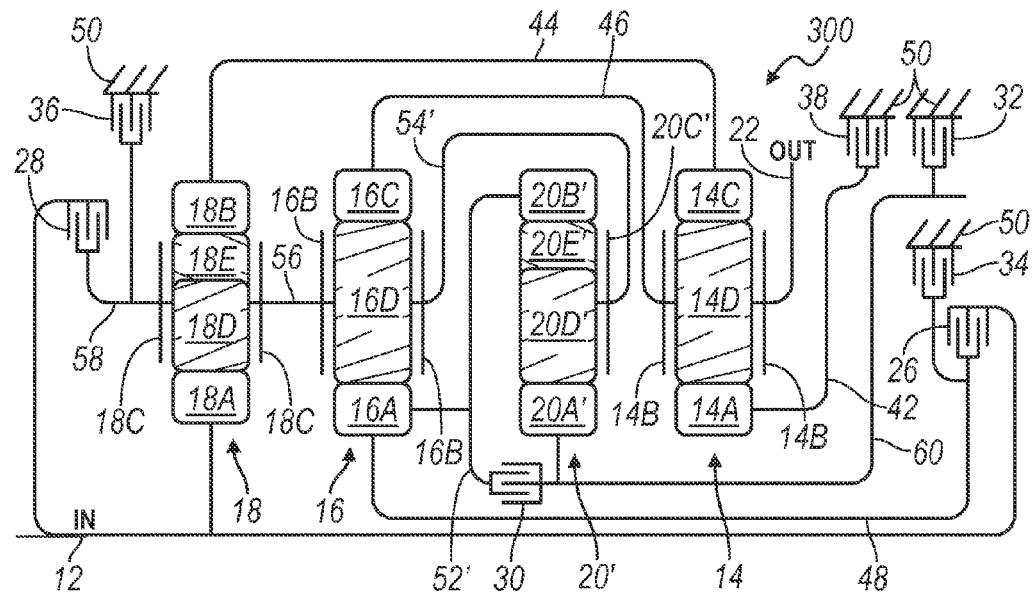
FIG. 6 is a diagrammatic illustration of yet another embodiment of a ten speed transmission according to the present invention.

Referring now to FIG. 6, still another embodiment of a multi-speed transmission is illustrated in schematic form and referenced by reference numeral 300, in accordance with the present invention. Transmission 300, with the exception of the addition of a third clutch 30, has the same physical components and interconnections (i.e. planetary gear sets, clutches, brakes and interconnections) as shown and described with respect to transmission 100. Third clutch 30 is selectively engageable to interconnect interconnecting member or shaft 52' with interconnecting member or shaft 60. More specifically, third clutch 30, in the instant embodiment, is selectively engageable to interconnect ring gear 20B' and sun gear 16A with sun gear 20A', as shown in FIG. 6.

Referring now to FIG. 5, FIG. 6 and FIG. 7, the operation of the ten speed transmissions 200 and 300 will be described. Each of the ten forward and one reverse speed or torque ratio is attained by engagement of one or more of the torque-transmitting mechanisms (i.e. first clutch 26, second clutch 28, third clutch 30, first brake 32, second brake 34, third brake 36 and fourth brake 38) as shown in the torque transmitting element or clutch table of FIG. 7. Specifically, the addition of third clutch 30 provides a different gear ratio for $4^{th}$ gear as compared to the previously described transmission embodiments. In order to achieve $4^{th}$ gear, transmissions 200 and 300 selectively engage third clutch 30 and fourth brake 38. As described above, third clutch 30 interconnects interconnecting member or shaft 52' with interconnecting member or shaft 60. Fourth brake 38 connects the first shaft or interconnecting member 42 with the stationary element or the transmission housing 50 in order to restrict the member 42 from rotating relative to the transmission housing 50. Likewise, the other nine forward ratios and reverse ratio are achieved through different combinations of clutch and brake engagement, as shown in FIG. 7.

It will be appreciated that the foregoing explanation of operation and gear states of the multi-speed transmissions 10', 100, 200 and 300 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, third and fourth planetary gear sets each having first, second and third members;
a plurality of interconnecting members continuously interconnecting a member of the first, second, third and fourth planetary gear sets with another member of the first, second, third and fourth planetary gear sets; and
at least six torque transmitting mechanisms wherein at least two of the at least six torque transmitting mechanisms are each selectively engageable to interconnect at least one of the first, second and third members with at least one other of the first, second, third members and wherein four of the at least six torque transmitting mechanisms are each selectively engageable to interconnect at least one of the first, second and third members with a stationary member, and
wherein the at least six torque transmitting mechanisms are selectively engageable in combinations of at least two to establish a plurality of forward speed ratios and at least one reverse speed ratio between the input member and the output member,
wherein the plurality of interconnecting members further comprises a first interconnecting member continuously interconnecting the second member of the first planetary gear set with the third member of the second planetary gear set, a second interconnecting member continuously interconnecting the third member of the first planetary gear set with the second member of the third planetary gear set, a third interconnecting member continuously interconnecting the second member of the second planetary gear set with the third member of the third planetary gear set and the third member of the fourth planetary gear set and a fourth interconnecting member continuously interconnecting the first member of the second planetary gear set with the second member of the fourth planetary gear set.

2. The transmission of claim 1 wherein a first of the at least six torque transmitting mechanisms is selectively engageable to interconnect the first member of the second planetary gear set with the first member of the third planetary gear set and the input member.

3. The transmission of claim 2 wherein a second of the at least six torque transmitting mechanisms is selectively engageable to interconnect the first member of the third planetary gear set and the input member with the third member of the fourth planetary gear set.

4. The transmission of claim 3 wherein a third of the at least six torque transmitting mechanisms is selectively engageable to interconnect the first member of the fourth planetary gear set with the stationary member.

5. The transmission of claim 4 wherein a fourth of the at least six torque transmitting mechanisms is selectively engageable to interconnect the first member of the second planetary gear set with the stationary member.

6. The transmission of claim 5 wherein a fifth of the at least six torque transmitting mechanisms is selectively engageable to interconnect the third member of the third planetary gear set with the stationary member.

7. The transmission of claim 6 wherein a sixth of the at least six torque transmitting mechanisms is selectively engageable to interconnect the first member of the first planetary gear set with the stationary member.

8. The transmission of claim 1 wherein a seventh torque transmitting mechanism selectively engageable to interconnect the first member of the fourth planetary gear set with the first member of the second planetary gear set and the second member of the fourth planetary gear set.

9. The transmission of claim 1 wherein the input member is continuously connected for common rotation with the first member of the third planetary gear set.

10. The transmission of claim 1 wherein the output member is continuously connected for common rotation with the second member of the first planetary gear set and the third member of the second planetary gear set.

11. The transmission of claim 1 wherein the first member of the first planetary gear set, the first member of the second planetary gear set, the first member of the third planetary gear set and the first member of the fourth planetary gear set are sun gears, the second members of the first, second and fourth planetary gear sets and the third member of the third planetary gear set are carrier members and the third member of the first planetary gear set, the third member of the second planetary gear set, the second member of the third planetary gear set and the third member of the fourth planetary gear set are ring gears, and wherein the carrier member of the third planetary gear set is configured to support a first and a second set of pinions, wherein the first set of pinions mesh with both the sun gear of the third planetary gear set and the second set of pinions and the second set of pinions mesh with both the ring gear of the third planetary gear set and the first set of pinions.

12. The transmission of claim 1 wherein the first member of the first planetary gear set, the first member of the second planetary gear set, the first member of the third planetary gear set and the first member of the fourth planetary gear set are sun gears, the second members of the first and second planetary gear sets and the third member of the third planetary gear set and the third member of the fourth planetary gear set are carrier members and the third member of the first planetary gear set and the third member of the second planetary gear set and the second member of the third planetary gear set and the second member of the fourth planetary gear set are ring gears and wherein the carrier member of the third planetary gear set is configured to support a first and a second set of pinions, wherein the first set of pinions mesh with both the sun gear of the third planetary gear set and the second set of pinions and the second set of pinions mesh with both the ring gear of the third planetary gear set and the first set of pinions and wherein the carrier member of the fourth planetary gear set is configured to support a first and a second set of pinions, wherein the first set of pinions mesh with both the sun gear of the fourth planetary gear set and the second set of pinions and the second set of pinions mesh with both the ring gear of the fourth planetary gear set and the first set of pinions.

13. A transmission comprising:
an input member;
an output member;
first, second, third and fourth planetary gear sets each having first, second and third members;
a first interconnecting member continuously interconnecting the second member of the first planetary gear set with the third member of the second planetary gear set;
a second interconnecting member continuously interconnecting the third member of the first planetary gear set with the second member of the third planetary gear set;
a third interconnecting member continuously interconnecting the second member of the second planetary gear set with the third member of the third planetary gear set and the third member of the fourth planetary gear set;
a fourth interconnecting member continuously interconnecting the first member of the second planetary gear set with the second member of the fourth planetary gear set; and
six torque transmitting mechanisms each selectively engageable to interconnect at least one of the first, second, and third members with at least one other of the first, second, third members and a stationary member, and
wherein the six torque transmitting mechanisms are selectively engageable in combinations of at least two to establish at least eight forward speed ratios and at least one reverse speed ratio between the input member and the output member.

14. The transmission of claim 13 wherein a first of the six torque transmitting mechanisms is selectively engageable to interconnect the first member of the second planetary gear set with the first member of the third planetary gear set and the input member.

15. The transmission of claim 14 wherein a second of the six torque transmitting mechanisms is selectively engageable to interconnect the first member of the third planetary gear set and the input member with the third member of the fourth planetary gear set.

16. The transmission of claim 15 wherein a third of the six torque transmitting mechanisms is selectively engageable to interconnect the first member of the fourth planetary gear set with the stationary member.

17. The transmission of claim 16 wherein a fourth of the six torque transmitting mechanisms is selectively engageable to interconnect the first member of the second planetary gear set with the stationary member.

18. The transmission of claim 17 wherein a fifth of the six torque transmitting mechanisms is selectively engageable to interconnect the third member of the third planetary gear set with the stationary member.

19. The transmission of claim 18 wherein a sixth of the six torque transmitting mechanisms is selectively engageable to interconnect the first member of the first planetary gear set with the stationary member.

20. The transmission of claim 13 wherein a seventh torque transmitting mechanism selectively engageable to interconnect the first member of the fourth planetary gear set with the first member of the second planetary gear set and the second member of the fourth planetary gear set.

21. The transmission of claim 13 wherein the input member is continuously connected for common rotation with the first member of the third planetary gear set.

22. The transmission of claim 13 wherein the output member is continuously connected for common rotation with the second member of the first planetary gear set and the third member of the second planetary gear set.

23. The transmission of claim 13 wherein the first member of the first planetary gear set, the first member of the second planetary gear set, the first member of the third planetary gear set and the first member of the fourth planetary gear set are sun gears, the second members of the first, second and fourth planetary gear sets and the third member of the third planetary gear set are carrier members and the third member of the first planetary gear set, the third member of the second planetary gear set, the second member of the third planetary gear set and the third member of the fourth planetary gear set are ring gears, and wherein the carrier member of the third planetary gear set is configured to support a first and a second set of pinions, wherein the first set of pinions mesh with both the sun gear of the third planetary gear set and the second set of pinions and the second set of pinions mesh with both the ring gear of the third planetary gear set and the first set of pinions.

24. The transmission of claim 13 wherein the first member of the first planetary gear set, the first member of the second planetary gear set, the first member of the third planetary gear set and the first member of the fourth planetary gear set are sun gears, the second members of the first and second planetary gear sets and the third member of the third planetary gear set and the third member of the fourth planetary gear set are carrier members and the third member of the first planetary gear set and the third member of the second planetary gear set and the second member of the third planetary gear set and the second member of the fourth planetary gear set are ring gears and wherein the carrier member of the third planetary gear set is configured to support a first and a second set of pinions, wherein the first set of pinions mesh with both the sun gear of the third planetary gear set and the second set of pinions and the second set of pinions mesh with both the ring gear of the third planetary gear set and the first set of pinions and wherein the carrier member of the fourth planetary gear set is configured to support a first and a second set of pinions, wherein the first set of pinions mesh with both the sun gear of the fourth planetary gear set and the second set of pinions and the second set of pinions mesh with both the ring gear of the fourth planetary gear set and the first set of pinions.

25. A transmission comprising:
an input member;
an output member;
first, second, third and fourth planetary gear sets each having a sun gear, a carrier member and a ring gear, wherein the input member is continuously connected for common rotation with the sun gear of the third planetary gear set, and wherein the output member is continuously connected for common rotation with the carrier member of the first planetary gear set and the ring gear of the second planetary gear set and wherein the carrier member of the third planetary gear set is configured to support a first and a second set of pinions, wherein the first set of pinions mesh with both the sun gear of the third planetary gear set and the second set of pinions and the second set of pinions mesh with both the ring gear of the third planetary gear set and the first set of pinions;
a first interconnecting member continuously interconnecting the carrier member of the first planetary gear set with the ring gear of the second planetary gear set;
a second interconnecting member continuously interconnecting the ring gear of the first planetary gear set with the ring gear of the third planetary gear set;
a third interconnecting member continuously interconnecting the carrier member of the second planetary gear set with the carrier member of the third planetary gear set and the ring gear of the fourth planetary gear set;
a fourth interconnecting member continuously interconnecting the sun gear of the second planetary gear set with the carrier member of the fourth planetary gear set;
a first torque transmitting mechanism selectively engageable to interconnect the sun gear of the second planetary gear set with the sun gear of the third planetary gear set and the input member;
a second torque transmitting mechanism selectively engageable to interconnect the sun gear of the third planetary gear set and the input member with the ring gear of the fourth planetary gear set;
a third torque transmitting mechanism selectively engageable to interconnect the sun gear of the fourth planetary gear set with a stationary member;
a fourth torque transmitting mechanism selectively engageable to interconnect the sun gear of the second planetary gear set with the stationary member;
a fifth torque transmitting mechanism selectively engageable to interconnect the carrier member of the third planetary gear set with the stationary member;
a sixth torque transmitting mechanism selectively engageable to interconnect the sun gear of the first planetary gear set with the stationary member, and
wherein the torque transmitting mechanisms are selectively engageable in combinations of at least two to establish a plurality of forward speed ratios and at least one reverse speed ratio between the input member and the output member.

26. A transmission comprising:
an input member;
an output member;
first, second, third and fourth planetary gear sets each having a sun gear, a carrier member and a ring gear, wherein the input member is continuously connected for common rotation with the sun gear of the third planetary gear set, and wherein the output member is continuously connected for common rotation with the carrier member of the first planetary gear set and the ring gear of the second planetary gear set and wherein the carrier member of the third planetary gear set is configured to support a first and a second set of pinions, wherein the first set of pinions mesh with both the sun gear of the third planetary gear set and the second set of pinions and the second set of pinions mesh with both the ring gear of the third planetary gear set and the first set of pinions;
a first interconnecting member continuously interconnecting the carrier member of the first planetary gear set with the ring gear of the second planetary gear set;
a second interconnecting member continuously interconnecting the ring gear of the first planetary gear set with the ring gear of the third planetary gear set;
a third interconnecting member continuously interconnecting the carrier member of the second planetary gear set with the carrier member of the third planetary gear set and the ring gear of the fourth planetary gear set;
a fourth interconnecting member continuously interconnecting the sun gear of the second planetary gear set with the carrier member of the fourth planetary gear set;
a first torque transmitting mechanism selectively engageable to interconnect the sun gear of the second planetary gear set with the sun gear of the third planetary gear set and the input member;
a second torque transmitting mechanism selectively engageable to interconnect the sun gear of the third planetary gear set and the input member with the ring gear of the fourth planetary gear set;
a third torque transmitting mechanism selectively engageable to interconnect the sun gear of the fourth planetary gear set with a stationary member;
a fourth torque transmitting mechanism selectively engageable to interconnect the sun gear of the second planetary gear set with the stationary member;
a fifth torque transmitting mechanism selectively engageable to interconnect the carrier member of the third planetary gear set with the stationary member;
a sixth torque transmitting mechanism selectively engageable to interconnect the sun gear of the first planetary gear set with the stationary member; and
a seventh torque transmitting mechanism selectively engageable to interconnect the sun gear of the fourth planetary gear set with the sun gear of the second planetary gear set and the carrier member of the fourth planetary gear set, and wherein the torque transmitting mechanisms are selectively engageable in combinations of at least two to establish a plurality of forward speed ratios and at least one reverse speed ratio between the input member and the output member.

\* \* \* \* \*